3,467,192
INHIBITION OF ADHERENT SCALE ACCUMULATIONS
Thomas J. Nolan III, and Charles F. Smith, Tulsa, Okla., assignors to The Dow Chemical Company, Midland, Mich., a corporation of Delaware
No Drawing. Filed Jan. 26, 1968, Ser. No. 700,699
Int. Cl. E21b *43/00;* C09k *3/00;* C02b *5/00*
U.S. Cl. 166—279                                         7 Claims

ABSTRACT OF THE DISCLOSURE

A method of inhibiting the deposition of scale in or on equipment used in the production of fluids from geologic formations via a wellbore and also in the pores and passageways of the formation in the immediate vicinity of the wellbore, said method comprising emplacing a composition comprising an organophosphorus compound, for sequestering ions which impart hardeners to water, and an adsorption agent, for better adherence of the organophosphorus compound to the formation, into the peripheral regions of the fluid-producing zone of the formation where they will be contacted by formation waters containing scale-forming ions as they move toward the wellbore.

---

Geologic formations comprising sedimentary rock strata often contain fluids, e.g., natural gas, petroleum, brine, and/or water, which may contain any of many dissolved or suspended organic and inorganic materials. Many such fluids have some economic significance.

Methods of obtaining such fluids usually entail drilling a well into the fluid-bearing stratum and, by means of formation pressure plus pump pressure and/or fluid injected down another well into the stratum forcing the formation fluids through the formation to the well and thence up to ground level.

During the life of these wells, the metal parts associated therewith often become coated with scale, resulting in serious impairment of production via a well. For example, deposits of such minerals as calcium, barium, and magnesium salts, particularly the sulfates, tend to accumulate on or in casing, tubing, pump chambers, valves, sucker rods, and transfer lines. Also minerals tend to deposit or redeposit in the formation near the wellbore. An especially troublesome deposit is calcium sulfate, common forms of which are anhydrite and gypsum, usually mixed with iron oxide and traces of other hard tenacious mineral deposits. These deposits grow by the accretion of molecular particles into crystalline clusters.

Efforts have been made to lessen the harm which results from such deposition. One approach to the problem which has met with success under some conditions is that described in the Earlougher U.S. Patent 3,021,901 which comprises emplacing, at fracturing pressures, an alkali metal alkaline earth polyphosphate in a carrier liquid, in the more remote or peripheral region of a pay zone whereby formation water containing scale-forming ions contacts the employed polyphosphate which sequesters the offending ions by forming complexes which are relatively nonscale-forming. There are certain limitations on the use of such polyphosphates according to Earlougher; they cannot be satisfactorily employed at temperatures substantially higher than 200° F., or in acid or heavy brine fracturing fluids because under those conditions they tend to revert to calcium orthophosphate. The practice of the Earlougher patent is also limited to fracturing whereas it is often undesirable to fracture a well just at a time when scale accumulation is a problem. This is particularly true where such accumulation occurs in a waterflood operation.

A compound, other than polyphosphates, known to inhibit scale formation broadly, are certain organophosphorus compounds as described in the Ralston U.S. Patent 3,336,221. However, the slow solubility of such compounds and their use in subterranean formations as a slowly available sequestering agent for scale-forming ions present in formation waters is not suggested therein and has been heretofore unknown.

Inhibitors to forming scale on well equipment have been forced into fluid bearing formations at sub-fracturing pressures known as matrix squeeze treatment. If an inhibitor thus injected is to be fully satisfactory, it should remain effective for extended periods of time, e.g., 6 months or more by solubilizing off the formation at a rate not appreciably in excess of that amount which provides about 2 to 4 p.p.m. in the contacting water. This approach to the scale problem has not succeeded well because the thus emplaced inhibitor has usually not adhered satisfactorily to the formation and was effective, following emplacement of the inhibitor, for a relatively short time.

The need continues for a more satisfactory method of inhibiting scale deposition or redeposition of tenaciously adhering deposits which normally accumulate on well equipment and within the interstices of a formation next to the wellbore during the production of hydrocarbonaceous fluids from the earth when "hard" underground waters are brought into contact with such metal surfaces and pores of the formation. There is a particular need for a method which provides a long lasting sequestering agent for scale-forming ions, in situ, that is effective in acidizing, fracturing, and squeeze treatments over a wide range of temperatures. There is a particular need in acidizing fluid-bearing formations.

Acidizing is carried out in $CaCO_3$-containing formations, e.g., limestone, dolomite, or sandstone containing $CaCO_3$ pockets and striations. Acidizing comprises injecting into the formation to be treated a fluid having a pH value substantially less than 7 usually an aqueous acidic solution, e.g., sulfuric, hydrochloric, hydrofluoric, formic, citric, acetic, or other acid, or mixture of inorganic acids, mixture of carboxylic acids, or mixtures of both inorganic and carboxylic acids of sufficient ionization constant (almost invariably containing an inhibitor to corrosivity to metal parts, e.g., the inhibitor described in U.S. Patents 1,877,504 or 3,077,454) into a geologic formation, and allowing the acid to attack chemically the strata by etching the rock and thereby to create channels or passageways therein. The passageways so created improve the permeability and facilitate the passage of fluids through the formation to the well.

Many of the formations which are to be acidized contain some sulfate, some of which is gradually dissolved in formation fluids and redeposited elsewhere to create problems. A prevailing type of such sulfate is anhydrite which is an orthorhombic variety of anhydrous calcium sulfate. The sulfates thus present usually reprecipitate, following acidizing, and settle or collect in the newly etched passageways and in the interstices of the acidized formation, and to some extent plug them, thereby defeating, to an objectionable extent, the primary objective of the treatment.

Efforts to correct this long recognized undesirable condition have not met with notable success. The invention is a method of locating in geologic subterranean formations an agent which greatly alleviates the harmful effects of hard waters in the formation.

The invention comprises forcing into the outer or peripheral regions of a producing interval in a fluid-bearing formation an aqueous and/or alcoholic solution of an organophosphorus (organophosphonate) scale inhibitor and an adsorption agent therefor whereby an effective amount of the organophosphonate inhibitor is emplaced in the formation and retained there sufficiently well to be gradually solubilized by formation water which comes in contact therewith to sequester or complex those scale-forming ions present in the water, over an extended period of time under a wide variety of conditions of production.

The scale inhibitor required by the method of the invention in a phosphoric acid-substituted alkyl amine, more accurately called (nitriloalkylene)phosphonic acid or ammonium or alkali metal salt of such acid. Such substituted acid is exemplified by [ethylenediamine (tetramethylenephosphonic acid)] or nitrilo(trimethylenephosphonic acid). The salt is exemplified by the sodium or ammonium salt of such acids. The formula below is illustrative of the required scale inhibitor required:

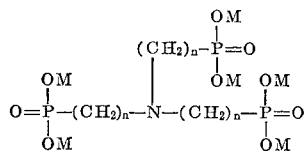

wherein M may be H (the acid form) or Na, K, or NH$_4$ (the salt form) or some M may be H and others K, Na, or NH$_4$. One or more of the M values, up to six may be the same or different. However, the pentavalent sodium salt is most often used. $n$ is an integer of 1 to 3.

The adsorption agent may be any surface active alkyl-substituted nitrogen-containing anionic material including primary, secondary, tertiary, and quaternary amines, preferably wherein each alkyl group consists of at least 2 carbon atoms and more especially recommended, including some alkyl groups of 10 to 14 carbon atoms. Illustrative of the adsorption agent is any quaternary ammonium halide having the generic formula R$_4$NX, wherein each R is independently selected from alkyls of from 2 to about 20 carbon atoms and X is a halide. Usually two of the R substituents contain from 10 to 14 carbon atoms and the other two contain either one or two carbon atoms. X is commonly chlorine.

An adsorption agent which typifies a preferred composition for use as that component of the invention is one usually referred to as dicocodimethyl ammonium chloride which is predominantly didodecyldimethyl ammonium chloride:

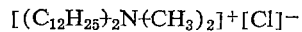

Commercially available quaternary ammonium halides useful in the practice of the invention are obtainable under the trademarks Aliquat 221 and Arquad 2C.

The practice of the invention may be illustrated by preparing an additament for use in the practice of the invention comprising a premixture of 40% to 60% water, 20% to 30% organophosphonate scale inhibitor, 10% to 25% alcohol, and 0.5% to 2.0% adsorption agent. A specific composition exemplary thereof is one consisting essentially by weight of:

25% of [nitrilotri(methylenephosphonic acid)];
1.0% of dicocodimethyl ammonium chloride;
20% C$_2$ to C$_4$ alcohol or glycol, e.g., isopropyl alcohol or ethylene glycol; and
54% water.

This is a rather concentrated solution which may be referred to as Stock Solution hereinafter. It is usually thereafter diluted further with water.

In carrying out the practice of the invention in a matrix squeeze treatment to inhibit scale formation, the formation should preferably be clean and free of previously formed scale deposits. Known treatments include that described in U.S. 3,240,627. Similar procedures may be used for this purpose.

When the vertical thickness of the producing interval is not over about 5 feet, it is recommended that a minimum of about 100 to 110 gallons (i.e., two 55-gallon drums) of the prepared solution of the nature of that described immediately above be admixed with from about 100 to 500 gallons of water. This amount of dilution includes sufficient excess of Stock Solution to compensate for that lost to the formation and meets the threshold requirement (i.e., that amount which must be exceeded for good results). In an alternate procedure, the undiluted Stock Solution may be injected into the formation provided that it is overflushed with an adequate volume of water. If the interval being treated has a vertical thickness greater than about 5 feet, the total of the composition employed in a complete treatment is increased. However, the increased amount required is not directly proportional since that necessary for the threshold requirement has been met. It is recommended that about 10 additional gallons of solution for each additional vertical foot, or about one 55-gallon barrel for each additional 5 feet, be provided.

The organophosphonate inhibitor may be employed in the practice of the invention in an amount of between about 0.1% and 20.0% by weight of the injected aqueous carrier liquid. However, the amount more commonly employed in nonacid carrier liquids is between about 0.5 and 1.5% by weight of the carrier liquid.

The amount of adsorption agent employed in the practice of the invention in nonacid carrier liquids may be between about 0.1 to 10.0% by weight of the carrier liquid but more commonly is between about 0.5 and 2.0% thereof.

When the carrier liquid is acidic, as in acidizing, the percent of both the organophosphonate inhibitor and adsorption agent are recommended to be in the higher range, e.g., 10% to 20% of the inhibitor and 5% to 10% of the adsorption agent, based on the total weight of solution employed.

Other agents known to be useful in well treating compositions may also be present, e.g., corrosion inhibitors in acidic carrier liquids and propping sand in fracturing. The following treatments are examples which illustrate the practice of the invention.

SERIES ONE

The tests of this series were conducted to show the efficacy of the practice of the invention to prevent deposition of normally relatively insoluble sulfate. The test was carried out by placing each of two aqueous solutions, one 4% Na$_2$SO$_4$ and the other 4% CaCl$_2$ in separate containers having outlet conduits provided with control valves, which joined to form a common conduit at a Y joint which in turn entered a readily removable 12-inch long 10 millimeter diameter collection tube of known weight. Blank tests were run wherein only the aqueous solutions of $Na_2SO_4$ and $CaCl_2$ were brought together in proportions to provide substantially the stoichiometric quantities for forming $CaSO_4$. In the test runs according to the invention, the alcohol-water solution of nitrilotri (methylenephosphonic acid) and didodecyldimethyl ammonium chloride was admixed therewith to provide the parts thereof per million parts of sulfate groups present, shown in Table I. The resulting composition is designated composition X below. The amount of scale collected in the collection tube was then ascertained by weighing the tube after each test. The weights of precipitated $CaSO_4$ are shown in Table I. The comparative tests are designated by letters and those illustrating the invention by numerals.

TABLE I

| Test identification: | Composition X in parts per million | Temperature in °F. | Weight of scale in grams |
|---|---|---|---|
| A | None | 110 | 4.098 |
| B | None | 150 | 10.944 |
| C | None | 190 | 12.391 |
| 1 | 10 | 110 | 0.774 |
| 2 | 10 | 150 | 2.132 |
| 3 | 10 | 190 | 4.309 |
| 4 | 25 | 110 | 0.018 |
| 5 | 25 | 150 | 0.622 |
| 6 | 25 | 190 | 1.756 |

Reference to Table I shows that the amount of deposited $CaSO_4$, after contacts of $Ca^{++}$ and $SO_4^{--}$ ions, is markedly reduced when the composition comprising the sequestering agent and adsorption agent in accordance with the invention is present. It shows that, although deposition is greater at the higher temperatures, the efficacy of the composition of the invention is highly effective at various temperatures. It shows that 10 p.p.m. of the composition gives very good results but that 25 p.p.m. is more effective.

SERIES TWO

This series of tests according to the invention was made to stimulate the residence time or the period following treatment of a well during which the sequestering agent in conjunction with the adsorption agent, injected during treatment, continues to be present in produced fluid. Test time of 150 hours correlates with at least about 12 weeks in a geologic formation. The tests were conducted as follows:

Berea sandstone cores, 12 inches long and 2 inches in diameter, were prepared. The cores were placed in a Hassler sleeve which permits fluid passage under pressure vertically downwardly, i.e. longitudinally through the core itself, but due to lateral pressure (exerted by an enveloping rubber sleeve containing oil under pressure) on the circumferential plastic or rubber sleeve in which the core is placed, fluid passage along the sides thereof, i.e., along the circumferential surface, is prevented. An aqueous slurry of $CaSO_4$ containing 5 parts of the composition X (composed essentially of the sequestering agent and adsorption agent in an 80% water: 20% isopropyl alcohol solution) was forced to flow through each core, positioned in the Hassler sleeve, until the cores were saturated. They were then allowed to stand for 12 hours. After that time, water was forced through each core to determine the amount of composition X in the effluent. The significant features of the tests and the results obtained are shown in Table II.

TABLE II

| | P.p.m. of composition X/comprising sequestering and adsorption in core effluent | | | |
|---|---|---|---|---|
| | Core identification | | | |
| | 1 | 2 | 3 | 4 |
| Time elapsed in hours, while water was flushed through cores at 10 ml./min. flow rate ¹: | | | | |
| 4 | 696 | 61 | 10 | |
| 8 | 640 | 27 | | |
| 12 | 75 | 16 | 21 | |
| 24 | 18 | 12 | | 42 |
| 28 | 3 | 10 | 27 | |
| 32 | 10 | 7 | | |
| 48 | 8 | 5 | 11 | 14 |
| 60 | 9 | 4 | 12 | |
| 72 | 5 | 4 | 8 | |
| 94 | 7 | | | |
| 108 | 0 | 5 | 3.5 | |
| 120 | | 4 | 0 | 9 |
| 144 | | | 0 | 4 |
| 152 | | | 1 | 4 |

¹ The pore volume of each core was 80 ml.

Reference to Table II shows that the effluent contains small amounts of sequestering and adsorption composition of the invention because it had been adsorbed in the interstitial spaces of the rock and was thereafter very gradually released by being contacted by water passing through the interstices of the rock, i.e., under conditions similar to those existing in rock in situ.

SERIES THREE.—COMPARATIVE TEST D AND TESTS 7, 8 AND 9 OF THE INVENTION

The following example was conducted to show the efficacy of the invention to prevent redeposition, which tends to occur during acidizing geologic formations.

With 1,000 ml. of a 15% by weight aqueous solution of HCl, was admixed 1 ml. of concentrated $H_2SO_4$.

100 ml.-portions of the solution so made were then poured into each of four 8-ounce bottles to be used in Tests D, 7, 8, and 9. To each of three of the portions were admixed sufficient nitrilotri(methylenephosphonic acid) to provide 500, 1,000 and 2,000 parts, respectively, per million parts of sulfate ions present, and small but effective amounts of an anionic amine. One portion (D) was left as a control blank. Into each of the four portions was then placed a piece of marble ($CaCO_3$), previously weighed, in an amount in excess of that required to react with the acid. The portions were allowed to stand for 8 hours during which reaction between the $Ca^{++}$ and $SO_4^{--}$ ions was complete, thus producing $CaSO_4$. Each of the four samples was filtered, and any $CaSO_4$ present as a precipitate was thereby collected on the filter paper and subsequently dried and weighed. The piece of marble remaining was reweighed. In the control portion containing the varying amounts of the sequestering agent, $CaSO_4$ was largely retained in solution and hence there was little precipitate. There was then determined the amount of $CaCO_3$ dissolved and the amount thereof which either precipitated out or remained in solution. The efficacy of the organophosphonic sequestering agent and adsorption agent composition is shown by the extent to which it lessens precipitation of $CaSO_4$.

The results are set out in Table III, infra.

SERIES FOUR.—COMPARATIVE TEST E AND TESTS 10, 11, AND 12 OF THE INVENTION

The tests of Series Three were repeated except that to each of four additional 150 ml.-portions of 15% by weight aqueous HCl containing $H_2SO_4$, three of which contained nitrilotri(methylenephosphonic acid) in amounts of 500, 1,000, and 2,000 p.p.m., respectively, there were admixed, prior to dissolving the $CaCO_3$ therein, 50 ml. of a synthetic brine prepared by dissolving 8% NaCl, 2.4% $CaCl_2$, 1.5% $MgCl_2$, 0.2% $Na_2SO_4$ and 0.08% $NaHCO_3$ in sufficient water to make 100% of brine. Pieces of marble, to provide an excess of Ca ions over the $SO_4$ ions present, were then weighed and one piece thereof placed in each of the 150 ml. portions, and the so treated portions allowed to stand during which the $CaCO_3$ of the marble reacted with the $H_2SO_4$. Thereafter, as in Series One, the precipitated $CaSO_4$ was filtered out, dried, weighed and the unreacted marble ($CaCO_3$) weighed. The extent to which the organophosphonic sequestering agent lessened precipitation of $CaSO_4$ formed is shown by the tests.

The blank test is identified by the letter D and those illustrative of the practice of the invention are identified by numbers 10, 11, and 12.

The results are also shown in Table III.

TABLE III

| Test No. | Solution containing 1,000 p.p.m. of ($SO_4$) | P.p.m. of methylenephosphonic acid scale inhibitor and adsorption agent | Weight in grams of marble dissolved | Weight in grams of $CaSO_4$ precipitated |
|---|---|---|---|---|
| D | 100 ml. of water | None | 22.9212 | 1.3652 |
| 7 | do | 500 | 22.4512 | [1] 1.0419 |
| 8 | do | 1,000 | 22.6969 | 0.7184 |
| 9 | do | 2,000 | 22.6694 | 0.5483 |
| E | 150 ml. of brine | None | 22.3540 | 1.6140 |
| 10 | do | 500 | 22.0878 | 0.8689 |
| 11 | do | 1,000 | 22.2275 | 0.8706 |
| 12 | do | 2,000 | 22.3727 | 0.8437 |

[1] In all numbered tests (examples of the invention) the precipitate of $CaSO_4$ was not only of less quantity than in the blank tests but remained in suspension, whereas in the blank tests the precipitate settled promptly.

Reference to Table III shows that the presence of both the organophosphonic sequestering agent and the adsorption agent composition in an acidizing solution, according to the invention, markedly lessens the amount of $CaSO_4$ which precipitates from the solution after prolonged contact with a source of $SO_4$ ions.

SERIES FIVE.—FIELD EXAMPLES OF THE INVENTION

Example 13

A field test of the organophosphonic scale inhibitor composition was made in an oil-producing well (Well A), in Andrews County, Tex. The well had been producing from the Queen Sand at a depth of 4,882 feet with a bottom hole temperature of 100° F. Previous tests indicated that calcium sulfate scale, in the form of anhydrite, following a conventional scale-removal treatment, would form in this well in approximately three months to such extent that another scale-removal treatment would be required.

In accordance with the invention, this well was treated with 189 gallons of the inhibitor prepared by admixing the ingredients and in the proportion described hereinabove as Stock Solution diluted with water to a total of 750 gallons. This mixture was pumped into the well at a rate of 0.61 bbl. per minute at an average surface treating pressure of 600 p.s.i.g. The formation was not fractured at this rate of injection. Following injection of the inhibitor, 1,000 gallons of water were injected immediately following the inhibitor to serve as an overflush, and to push the inhibitor to a distance of about 5 feet from the wellbore. The thickness of the producing interval treated was estimated to be about 50 feet.

The well was placed back in production 24 hours after injection of the fluid and continued to produce. Tests were periodically taken on the oil being produced to determine the amount of previously emplaced organosulfonate inhibitor present in it. The scale inhibitor was found present throughout the testing period at a concentration which averaged about 8 p.p.m. for a period of 190 days following treatment. Although tests were then discontinued, it is estimated that the well will be protected from scale deposition for a period of at least about 9 to 11 months.

Example 14

A second field test was conducted on an oil-producing well (Well B) in Andrews County, Tex., which was producing also from the Queen Sand formation. The well was 4,550 feet deep and had a bottom hole temperature of 90° F. The producing zone had an average thickness of about 19 feet. Calcium sulfate scale was causing extensive trouble by forming adherent accumulations on equipment and in the pores of the formation.

The well was first cleaned by conventional methods employing an aqueous caustic solution to remove already deposited scale. Thereafter more of the same organophosphonate-dicocodimethyl ammonium chloride diluted Stock Solution which had been employed in Example 13 was injected down the well and back into the formation according to the following procedure:

110 gallons of the Stock Solution was diluted with water to 500 gallons. The so diluted inhibitor composition was injected at a rate of 3.6 feet/minute which was of such velocity to produce fracturing of the formation. Thereafter 10 barrels of water were injected as an overflush to force the inhibitor back in the peripheral regions of the producing zone served by the well.

After 24 hours following the overflushing, the well was placed back into production, flowing 42 barrels of oil and 16 barrels of water per day. Tests for dissolved-previously emplaced organophosphonic inhibitor were conducted over a period of 190 days. The tests showed that an average of about 7 p.p.m. of inhibitor were present in the produced oil.

Having described our invention, what we claim and desire to protect by Letters Patent is:

1. The method of inhibiting the deposition of scale on equipment used in the production of fluids from a subterranean fluid-bearing formation via a wellbore penetrating the formation and in the pores of the formation in the vicinity of the wellbore, which comprises injecting down the wellbore and back into the peripheral regions of the formation which are more remote from the wellbore, an aqueous composition of (1) an organophosphorus sequestering agent selected from the class consisting of phosphoric acid-substituted alkyl amines and ammonium and alkali metal salts of such acids, and mixtures thereof and (2) a surface active adsorption agent comprising an alkyl-substitute nitrogen-containing anionic amine and causing an effective amount of said composition to lodge in an be retained in the pores of the formation whereby formation waters will contact said composition and scale-forming ions present in said waters will be complexed and sequestered and thus rendered substantially nonscale forming for an appreciable long time.

2. The method according to claim 1 wherein said organophosphorus sequestering agent has the generic formula:

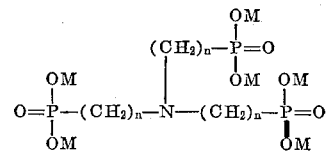

wherein M is selected from the group consisting of H, Na, K, and $NH_4$ and combinations thereof and $n$ is an integer integer of 1 to 3.

3. The method according to claim 1 wherein said surface active adsorption agent is an alkyl quaternary ammonium halide compound and each alkyl group contains from about 8 to about 16 carbon atoms.

4. The method according to claim 1 wherein said organophosphorus sequestering agent is present in an amount of between about 0.05% and 20.0% by weight of the injected aqueous composition.

5. The method according to claim 1 wherein the surface active adsorption agent is present in an amount of between about 0.1% and 10.0% by weight of the aqueous composition.

6. The method according to claim 2 wherein the organophosphorus sequestering agent is selected from the group consisting of nitrilotri(methylenephosphonic acid), [ethylenediamine (tetramethylenephosphonic acid)] and ammonium and alkali metal salts of such acids and mixtures of such acids and salts.

7. The method according to claim 3 wherein said surface active adsorption agent has the generic formula:

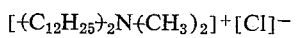

References Cited

UNITED STATES PATENTS

| 3,336,221 | 8/1967 | Ralston. | |
|---|---|---|---|
| 3,393,150 | 7/1968 | Ralston | 210—58 |
| 3,412,025 | 11/1968 | Ostroff. | |

CHARLES E. O'CONNELL, Primary Examiner

I. A. CALVERT, Assistant Examiner

U.S. Cl. X.R.

210—58; 252—8.55, 180